United States Patent [19]

Sekavec, Jr.

[11] Patent Number: 4,589,950

[45] Date of Patent: May 20, 1986

[54] METHOD AND APPARATUS FOR ADHESIVE OR SEALANT APPLICATION

[76] Inventor: John Sekavec, Jr., 3600 Colorado Ave., Loveland, Colo. 80537

[21] Appl. No.: 407,723

[22] Filed: Aug. 13, 1982

[51] Int. Cl.[4] .............. B32B 31/00

[52] U.S. Cl. .............. 156/578; 118/259; 118/264; 118/266; 118/271

[58] Field of Search .............. 118/271, 264, 266, 258, 118/259; 156/578

[56] References Cited

U.S. PATENT DOCUMENTS

| | | | |
|---|---|---|---|
| 1,173,085 | 2/1916 | Beeching | 118/266 X |
| 2,526,311 | 10/1950 | Wilson | 118/264 UX |
| 3,145,121 | 8/1964 | Kraft et al. | 118/271 X |
| 3,152,011 | 10/1964 | Gerard | 118/266 X |
| 3,427,840 | 2/1969 | Richter | 118/266 X |
| 3,862,617 | 1/1975 | Prestegaard | 118/259 |
| 4,224,870 | 9/1980 | Mikulas | 118/213 X |

*Primary Examiner*—David Simmons
*Attorney, Agent, or Firm*—Hugh H. Drake

[57] ABSTRACT

An adhesive or sealant is applied to a product by receiving and maintaining the adhesive in liquid form, distributing it to form a film of the material over a predetermined exposed surface area and moving the product relative to the surface area to transfer the material to the product. This is accomplished by use of a housing in which is defined an outwardly opening cavity. A port in the housing admits the liquid material into the cavity. A pad of porous open-cell metal foam covers the opening, with the density of the foam being selected relative to the viscosity parameters of the adhesive to wick or ooze the adhesive from the cavity through the foam and present a film of the adhesive over the outwardly facing surface of the pad. A screen may be disposed over the outwardly facing surface of the pad.

6 Claims, 4 Drawing Figures

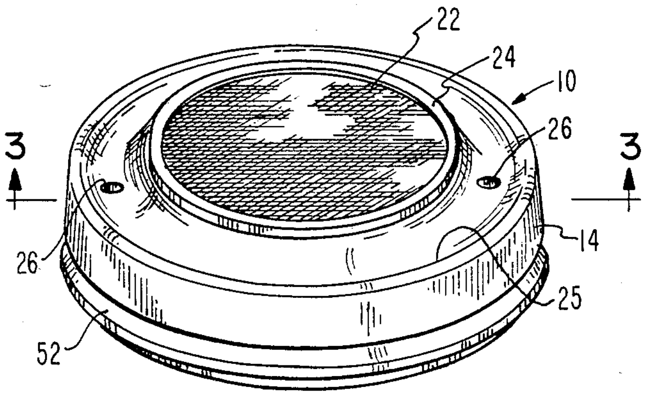
FIG. 2
FIG. 4
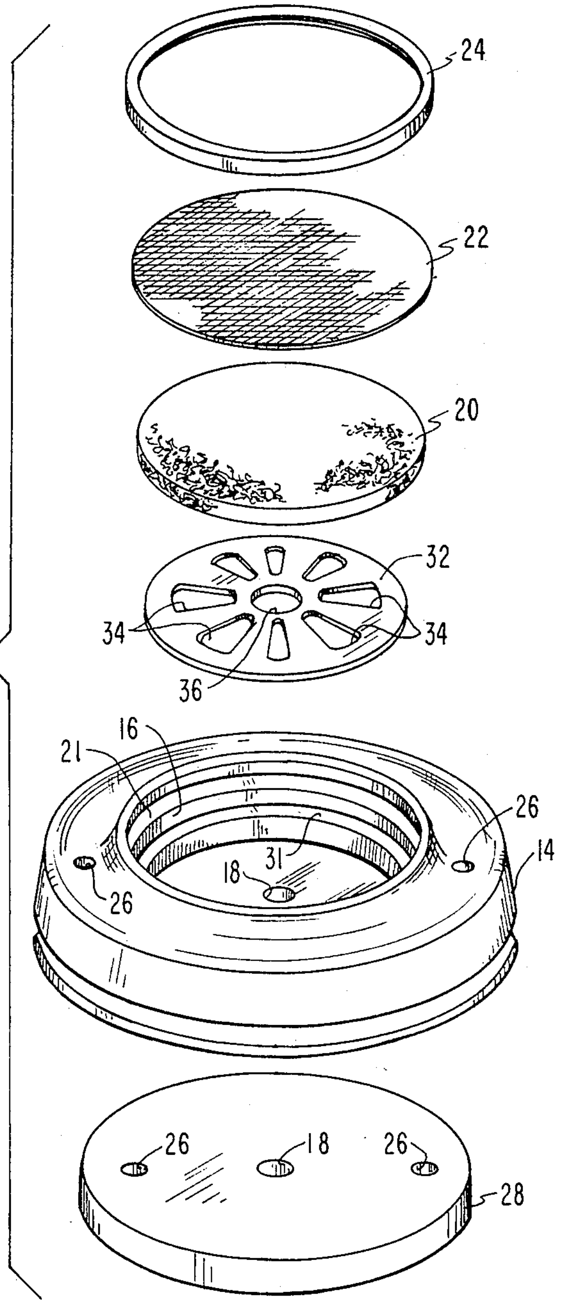
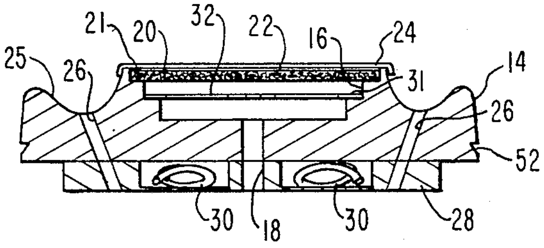
FIG. 3

METHOD AND APPARATUS FOR ADHESIVE OR SEALANT APPLICATION

The present invention pertains to method and apparatus for adhesive or sealant application. More particularly, it relates to the handling of a liquid glue or sealant for presentation to a surface of a product which is to be bonded or sealed by the material to another product surface.

Hot melt adhesives have found widespread use throughout industry for bonding a wide variety of materials which include wood, leather, paper, fabric, metals, a variety of plastics, cardboard and other porous and non-porous substrates. A commonplace example of their use is in the gluing of the flaps of cardboard cartons. The strips or patches of glue observed upon opening the cartons often have been applied by the use of the hot melt approach. The adhesive is purchased in solid form in any of a variety of shapes depending upon the machinery used for application. Those shapes include slugs, sticks, cartridges, pellets, rope, cylinders, films and tape. Typically, such adhesives are polymeric in nature. Their use eliminates any need for mixing, drying and special curing, and they have the advantage that they may be used in an explosive atmosphere. They exhibit long shelf life and offer maximum ease and safety of shipping, storage and handling.

In use, the originally solid adhesive material is liquified by the application of heat and fed through an applicator which delivers the melted adhesive through a form of extruder, nozzle or other kind of what often is referred to as a gun or head. Whether the mode of application is manually or machine controlled, it generally is limited to the application of the melted adhesive in one or more narrow strips of pre-selected width. With an automated approach, the pattern to be established, or the variations in patterns available, is limited by the form of the machinery. When using a hand-held or manually-operated gun, the operator must be trained and experienced in order to apply the proper amount of the adhesive. Too little, of course, results in an insufficient bonding. Too much is at least not economical and may result in a spreading of the still-liquid adhesive to an undesired area. That is, such guns lack versatility as to manner of application and they tend to be excessively time consuming either to set up or to operate. At least in some versions, the applicators also are wasteful of the hot melt adhesive, in that an excessive amount of the already melted adhesive must be discarded at the end of a given operational period in order to prevent contamination by foreign materials and consequent plugging of components of the apparatus, such as hoses, orifices and valves.

A somewhat analogous field of application is that involving the use of liquid silicone rubber, particularly compounds thereof that exhibit vulcanization at room temperature. Such compounds are available from General Electric Company through its Silicone Products Department at Waterford, N.Y., typical applications having been described in its publication CDS-191 Rev. A. Although handled at room temperatures, those materials are especially valuable for their variations in viscosities, subsequent high-temperature resistance, strength and many other features of utility. Nevertheless, application apparatus has encountered many difficulties that are at least similar to those encountered with the use of hot-melt adhesives.

It is, accordingly, a general object of the present invention to provide adhesive or sealant application in a manner which overcomes deficiencies in prior art approaches such as those mentioned above.

Another object of the present invention is to provide an adhesive or sealant applicator which affords wide versatility in manner of use and manner of application.

A further object of the present invention is to provide an adhesive or sealant applicator which is economical of manufacture and use.

In accordance with the present approach, the manner of application involves receiving and maintaining the adhesive or sealant in liquid form. It is wicked or oozed and distributed to form a film over a pre-determined exposed surface area. A product is then brought into contact with that surface area in order to transfer the adhesive or sealant to the product.

The foregoing is achieved by apparatus which includes a housing in which is defined an outwardly-opening cavity. A port in the housing admits a liquid adhesive or sealant into the cavity. A pad of porous open-cell metal foam covers the opening of the cavity. The density of the foam is selected relative to the viscosity parameters of the adhesive or sealant to wick or ooze the material from the cavity through the foam and present a film of the material over the outwardly facing surface of the pad.

The features of the present invention which are believed to be patentable are set forth with particularity in the appended claims. The organization and method of operation of the invention, together with further objects and advantages thereof, may best be understood by reference to the following description taken in connection with the accompanying drawings, in the several figures of which like reference numerals identify like elements, and in which:

FIG. 2 is an isometric view of an applicator included in the apparatus of FIG. 1;

FIG. 3 is a cross sectional view taken along the line 3—3 in FIG. 2; and

FIG. 4 is an exploded isometric view of the applicator of FIG. 2.

Figure 1:
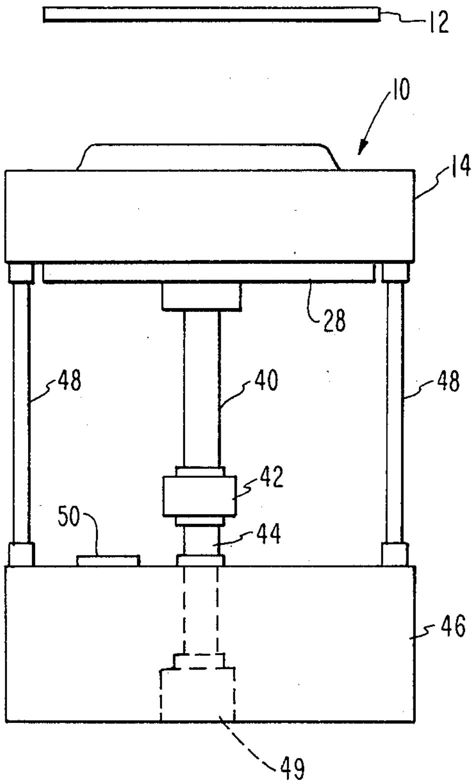
FIG. 1 is a diagram of an application apparatus embodying the present invention.

An applicator 10 is oriented beneath a product 12 facing a surface of which an adhesive, glue or sealant is to be applied. As a matter of providing a specific disclosure of a preferred embodiment of what is believed to be the best mode known for utility, the explanation which next follows is directed to the application of hot melt adhesives. However, attention is directed to subsequently-described references to other adhesives and sealants. Moreover, any such adhesives also may serve as sealants.

Applicator 10 includes a housing 14 within the interior of which is defined a cavity 16 which has an opening that faces outwardly from housing 14. Leading into the lower portion of housing 14 is a port 18 which serves to admit a liquified adhesive into cavity 16. Covering the outwardly-facing opening in cavity 16 is a pad 20 seated on a shelf 21. Pad 20 is formed of a porous open-cell metal foam. The density of the foam in pad 20 is selected relative to the viscosity parameters of the adhesive in order to wick or ooze the liquified adhesive from cavity 16 through the foam of pad 20 and present a film of the adhesive over the outwardly-facing surface of pad 20.

Disposed adjacent to the outwardly-facing surface of pad 20 is a mesh or screen 22 in this case held in place by a retainer ring 24. Adjacent to and surrounding pad 20 is a trough 25 from which downwardly depends a pair of space-opposed channels 26. Trough 25 together with channels 26 serve to collect and disburse excess overflow of the liquified adhesive delivered through pad 20.

Disposed in a base 28 affixed to or integral with the bottom of housing 1 is a circular heating element 30 situated in juxtaposition to housing 14. Heating element 30 is thermostatically controlled to maintain the entirety of applicator 10 at a temperature suitable to keep the interior of housing 14, pad 20 and screen 22 sufficiently heated to continue the liquified state of the adhesive.

Located on a shelf 31 within cavity 16 adjacent to but spaced slightly from the exit of port 18 is a dispersing plate 32. Plate 32 includes a plurality of circumferentially-spaced openings 34 and a central opening 36 which serve, in use, to disperse the liquified adhesive admitted through port 18 throughout the interior of cavity 16.

Port 18 is coupled through a hose 40, a flow control valve 42 and a hose 44 into a heated reservoir 46. Within the bottom of reservoir 46 is a pump 49. Channels 26 are, in this case, also coupled into reservoir 46 by hoses 48.

In use, a hot melt adhesive is placed through a suitable access opening 50, in any suitable form such as slugs or pellets, and therein melted to a liquid consistency. The liquified adhesive is then pumped through hoses 44 and 40, valve 42 and port 18 into cavity 16 through plate 32. From cavity 16, the liquified adhesive is delivered or wicked through pad 20 and thereafter through the perforations in screen 22 at a pressure just sufficient to cause the liquified adhesive to form a film on top of screen 22. Thereafter, either applicator 10 or product 12 is moved, so as to bring the undersurface of product 12 against that film and thereby enable transfer of the adhesive to the product. Of course, product 12 is subsequently placed against a surface of another product, or a different portion of the same product, so as to allow those two articles to be bonded together by the adhesive. That subsequent placement may be immediate or much later, after cooling, as part of a heat sealing operation, for example. As illustrated, housing 14 establishes a film surface which is circular in nature. In use, for any given application, it may have any shape or any size. Also shown on the exterior periphery of housing 14 is a groove 52. That may be employed in a conventional manner to snap-attach housing 14 to the remainder of an overall assembly. In a still different alternative, screen 22 may be replaced by another layer of the same material as pad 20 but of different porosity.

In itself, the hot melt adhesive is available in a wide variety of characteristics for selection as among the different kinds of materials intended to be bonded. Typical application temperatures are of the order of 400 degrees Fahrenheit, so that heater 30 is controlled to maintain housing 14 and its assembly at a corresponding temperature. These adhesive materials also typically exhibit melting points which occur in a range from about 200 to 300 degrees Fahrenheit. Accordingly, reservoir 46 is maintained at a temperature in that range, so as to ensure the delivery of liquified adhesive through port 18. The hot melts available will set up in as short a time as, perhaps, 15 seconds or require up to a minute or more. At least most are fully cured within an hour. For a given application, the user will examine the pertinent characteristics of the different adhesives available in order to choose the specific adhesive to be employed, based upon desired setting time, viscosity, the tensile strength necessary after subsequent cooling, the resiliency of the adhesive after cooling and the strength exhibited by the bonding at elevated temperatures to which the bonds later may be subjected. Full descriptions of such characteristics are well known as a result of publications by companies such as The Terrell Corporation of 820 Woburn Street, Wilmington, Mass. 01887 and the Hysol Division of the Dexter Corporation at Folly Mill Road, Seabrook, N.H. 03874.

The metallic foam material of which pad 20 is formed is now well known and available from a company such as Foametal, Inc. of 37645 Vine Street, Willoughby, Ohio 44094. It typically is manufactured from either nickel or copper and is available in density ranges of between about 5 percent and 60 percent, although it may be compressed in order to exhibit even higher densities, density being expressed herein as a percent of parent metal density. Such metal foam is open-cell in character and exhibits an open-pore web structure of metal fibers, the pore sizes being available in a range from about 0.050 inch to as small or smaller than about 10 microns. For present purposes, a density of anywhere between almost 0 and 90 percent appears to be preferable, depending upon the application. It also appears preferable to use the nickel type. Metal foam pads are readily available in thicknesses of ⅛ inch to ¼ inch. Should a greater thickness be desired, a plurality of layers may be stacked. In any case, the foam pad acts as an absorption plate which both distributes and disperses.

Pad 20 preferably has a pore size selected so that it acts like an ink pad. With a sufficiently small pore size, the material is wicked through as in a sponge or blotter. In a test, using nickel foam ⅛ inch thick with a density of sixty percent, a typical hot melt adhesive was wicked to a depth of 5/16 inch atop screen 22 in thirteen minutes. In the absence or in the enhancement of wicking, pressure is relied upon to saturate and permeate pad 20. In any case, pad 20 disperses the material and the material oozes out, as contrasted with being delivered in a confined stream or jet.

The diagram of FIG. 1 is entirely illustrative and only schematic. In a given system, applicator 10 may be combined directly with the stfucture of sump or reservoir 46, so that hoses 40, 44 and 48 may be eliminated. On the other hand, reservoir 46 may be located to the side, above, or at any other more convenient location. Moreover, a plurality of applicators may be connected to a common reservoir. Should the distance between reservoir 46 and applicator 10, however, be very great, the different hoses will need to be heated in order to maintain the liquidity of the adhesive during delivery or return of the melted adhesive. Such hoses for the handling of hot melt adhesives are conventional in their description and availability has been published by various companies, such as The Aro Corporation, One Aro Center, Bryan, Ohio 43506.

The combination of trough 25, channels 26 and hoses 48 will be observed to establish a complete recirculation system. Excess thickness of the film of the liquid exposed through screen 22 flows over retainer 24 and drains into trough 25 and is delivered back to reservoir 46 for recirculation. In an alternative, no more than one channel 26 is included, or an underlying collector is provided, so that only one hose 48 or other means of transfer back to the reservoir is required.

In a different alternative, pump 49 is of a reciprocating type and its speed is adjustable in a manner to oscillate the pressure of delivery of adhesive into cavity 16. In that mode, the effect of the oscillation is to maintain a predetermined desired thickness of the film as outwardly exposed through pad 20. That approach enables rather precise control of the film thickness, by flooding the screen to a desired depth, and may either augment or substitute for the recirculation by way of trough 25. That is, the pump injection stroke floods the screen after which the retraction stroke withdraws excess adhesive back into reservoir 46, leaving the desired film thickness on screen 22. Further, such pressure oscillation may be achieved by a separate controllable pressure regulator and flow control valve 42. For this purpose, pump 49 would desirably be double-acting. On the other hand, the same result may be achieved by including two pumps and two hoses and port systems which act in alternation.

It may be noted that applicator 10 is illustrated in an orientation in which a film is formed on an upwardly-facing surface and the product is moved relatively against that surface. That accommodates a mode of operation that includes the recirculation system by way of trough 25. However, in other alternatives, applicator 10 may have a different orientation. In the extreme, applicator 10 may even be oriented in a reversed position, so that it faces downwardly. In that case, and with proper control, pump 49 may be eliminated and the liquified adhesive may be fed from the reservoir by gravity.

Applicator 10 acts as a fluidized platen. Being in itself heated, it needs not be cleaned following use. Thus, retainer ring 24 may be eliminated and screen 22 may be simply welded or otherwise fixed in place in order to hold itself and pad 20 in position. Yet the glue may be used and applied without the need for any kind of solvent or catalyst as compared with materials, such as epoxies, which utilize both kinds of constituents. It is to be noted that such other kinds of materials require the implementation of a thorough cleaning job of any applicator after the operation ceases.

A principal purpose of screen 22 is to protect the surface of pad 20 from being damaged by the process of applying the material to the product. It also presents a smooth and flat surface, smoother than pad 20, for establishing the existence of a uniform film. As illustrated, screen 22 includes a plurality of uniformly-distributed perforations. It may alternatively be constructed of a woven material. In any case, screen 22 preferably establishes the existence of a structurally-sound external surface. In addition, it is to be noted that screen 22 need not be in a form which has uniform porosity. Instead, it may be in the nature of a metal mask which has openings arranged in a particularly selected pattern so as to extrude the adhesive in any arrangement desired.

The function of dispersing plate 32 may be achieved by several different alternatives. For example, an impeller or the like may be included at the outlet of port 18 in order to spread the inletted liquid adhesive. A plurality of ports 18 suitably distributed may be employed to achieve a similar objective. Especially in a smaller size of the device, the function of dispersing plate 32 may be found to be entirely unnecessary.

It will be evident that the approach disclosed exhibits great versatility in manner of specific design for a wide variety of different uses. It is highly economical of useage of the adhesive material, and, yet, it enables the taking of full advantage of the flexibility of useage provided by the conventionally available hot melt adhesives. It affords wide choices as among the different possible application patterns which may be desired. At the same time, it does not involve a complicated form of manufacture. In avoiding any requirement for extensive or frequent cleaning after use, it clearly is saving of labor expense.

The particular density and/or pore size selected for pad 20 will vary widely among different intended applications. In turn, it usually will be those intended applications which will determine the viscosity parameters of the specific hot melt of the adhesive selected. Of course, "viscosity" is usually a function of temperature, and its effect also is function of pressure. For a given system, the pressure may be a function of the kind of ultimate screen selected for a particular application. Thus, it will be necessary to select not only the particular adhesive for a given use but it also will be desirable to select the characteristics of pad 20 in view of those viscosity parameters.

For the use of conventional hot melt adhesives, screen 22 might typically have hole sizes of 0.005 inch diameter on 0.015 centers of an equilateral-triangle pattern. However, those parameters may vary widely among different applications. For example, the array might be formed in clusters of squares.

Applicator 10 may be mounted in a stationary position alongside an automated assembly line, a device such as a rotary indexing table or on the end of the arm of a mechanical robot. It advantageously may be of cylindrical form, so as to be a roller. In that form, two of the applicators may be space opposed for applying material to a sheet of, for example, gasket material that subsequently is die cut to provide individual gaskets for use between mating parts.

An analogous approach of such applicator rollers may be used for laminating a plurality of layers of like or unlike substrates. That is, space-opposed roller applicators would apply the adhesive to a base sheet, and laminate sheets would thereafter be fed under pressure rollers for joining to the base.

In a different alternative, retainer 24 is shaped to define a well that serves to retain a pool of the presented adhesive. This allows one end portion of a product to be dipped into that pool.

Delivery patterns may be defined by embossing pad 20. Highly compressing selected areas of pad 20 so reduces delivery in those compressed areas that a desired pattern of application is enabled.

The same approach also applies to adhesives and sealants such as the silicon-types which vulcanize at room temperature. They may be desired, because they exhibit subsequent flexibility at high temperatures and yet can be applied at low temperatures. Thus, heating elements are not needed in or in connection with applicator 10 in whatever form it may take.

As in the case of hot melt adhesives, such sealants are available with a wide range of choice as to specific characteristics. Some set up in only a few minutes and are fully cured within twenty-four hours. Curing time can be decreased by baking. These materials normally exhibit a medium viscosity, about like petroleum jelly, and they maintain that property in storage and while being used in the apparatus.

The same apparatus used for applying hot melt adhesives may be used for dispensing the silicone materials. A ball and gear pump preferably is used for supplying such materials to the applicator. No mixing of chemicals or clean up or purging of the system after use is required. Because they cure in air, however, they must be used in a closed system. Therefore, the working surface of applicator 10 should be capped with an airtight cover, of a material such as rubber, when the applicator is not in use.

While particular embodiments of the invention have been shown and described, and numerous modifications and alternatives have been taught, it will be obvious to those skilled in the art that further changes and modifications may be made without departing from the invention in its broader aspects. Therefore, the aim in the appended claims is to cover all such changes and modifications as fall within the true spirit and scope of that which is patentable.

I claim:

1. A material applicator comprising:

a housing;

means defining an outwardly-opening cavity within the interior of said housing;

a port in said housing for admitting a liquid adhesive or sealant material into said cavity;

a generally flat pad of porous open-cell metal foam covering said opening of said cavity, the density of said foam being selected relative to the viscosity parameters of said material to extrude said material from said cavity through said foam and present a film of said material over the outwardly facing surface of said pad;

and means for continually reciprocating the pressure of delivery for said liquid into said cavity in order to maintain a predetermined desired thickness of said film outwardly exposed through said pad after each successive application of said material.

2. An applicator as defined in claim 1 which further includes a pump for delivering said material into said port and in which said pump effectively reciprocates the delivery of said material into said cavity, the effect of the reciprocation being controllable to maintain said film cyclically at a predetermined desired thickness on said outwardly facing surface.

3. A material applicator comprising:

a housing;

means defining an outwardly-opening cavity within the interior of said housing;

a port in said housing for admitting a liquid adhesive or sealant material into said cavity;

a generally flat pad of porous open-cell metal foam covering said opening of said cavity, the density of said foam being selected relative to the viscosity parameters of said material to extrude said material from said cavity through said foam and present a flim of said material over the outwardly facing surface of said pad, said pad being compressed more by embossment in selected areas to reduce delivery in those areas and thereby define a desired pattern of application.

4. A material applicator as defined in claim 3 which further includes a screen, which presents a smooth and flat surface, disposed over the outwardly facing surface of said pad.

5. A material applicator comprising:

a housing;

means defining an outwardly-opening cavity within the interior of said housing;

a port in said housing for admitting a liquid adhesive or sealant material into said cavity;

a generally flat pad of porous open-cell metal foam covering said opening of said cavity, the density of said foam being selected relative to the visocity parameters of said material to extrude said material from said cavity through said foam and present a film of said material over the outwardly facing surface of said pad;

and a screen, which presents a smooth and flat surface, disposed over the outwardly facing surface of said pad.

6. A material applicator comprising:

a cylindrical housing which constitutes a roller;

means defining an outwardly-opening cavity within the interior of said housing;

a port in said housing for admitting a liquid ahesive or sealing material into said cavity;

a pad of porous open-cell metal foam covering said opening of said cavity, the density of said foam being selected relative to the viscosity parameters of said material to extrude said material from said cavity through said foam and present a film of said material over the outwardly facing surface of said pad;

means for continually reciprocating the pressure delivery for said liquid into said cavity in order to maintain a predetermined desired thickness of said film outwardly exposed through said pad after each successive application of said material;

a screen, which presents a smooth surface, disposed over the outwardly facing surface of said pad;

and said appicator, including said pad and said screen, defining a cylinder.

* * * * *